(12) United States Patent
Maybee et al.

(10) Patent No.: US 8,566,647 B2
(45) Date of Patent: Oct. 22, 2013

(54) DEBUGGER PRESENTATION OF PARALLEL APPLICATION THREADS

(75) Inventors: Paul Edward Maybee, Seattle, WA (US); Daniel Demetris George Moth, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 286 days.

(21) Appl. No.: 12/973,619

(22) Filed: Dec. 20, 2010

(65) Prior Publication Data

US 2012/0159261 A1    Jun. 21, 2012

(51) Int. Cl.
*G06F 11/00*    (2006.01)

(52) U.S. Cl.
USPC .......................................... 714/38.1; 717/124

(58) Field of Classification Search
USPC .................... 714/38.1, 57; 717/124
See application file for complete search history.

(56) References Cited

U.S. PATENT DOCUMENTS

| | | | |
|---|---|---|---|
| 7,428,727 B2 | 9/2008 | Alverson et al. | |
| 8,024,708 B2 * | 9/2011 | Demetriou et al. | 717/124 |
| 2009/0060032 A1 * | 3/2009 | Schmit et al. | 375/240.01 |

OTHER PUBLICATIONS

Moth et al. "Debugging Task-Based Parallel Applications in Visual Studio 2010". MSDN. Sep. 2009. pp. 5-7.*
"Using the Parallel Tasks Window", Retrieved at << http://msdn.microsoft.com/en-us/library/dd998369.aspx >>, Retrieved Date: Oct. 18, 2010 , pp. 4.
"Taking Parallelism Mainstream," Retrieved at << http://resourcekit.windowshpc.net/DEVELOPER/Papers2/Taking Parallelism Mainstream Microsoft Feb. 2009.pdf<<, Oct. 9, 2008, pp. 20.
Toub, Stephen et al., "Improved Support for Parallelism in the Next Version of Visual Studio," Retrieved at << http://msdn.microsoft.com/en-us/magazine/cc817396.aspx >>, Oct. 9, 2008, pp. 15.
Moth, Daniel et al., "Debugging Task-Based Parallel Applications in Visual Studio 2010," Retrieved at << http://msdn.microsoft.com/en-us/magazine/ee410778.aspx>>, Sep. 2009, pp. 12.
Watson, Greg, "ptp design document," Retrieved at <<http://www.eclipse.org/ptp/docs/design.html>>, Apr. 8, 2005, pp. 12.
Southwell, Annemarie, "Accelerating Visual C++ Applications on GPUs," Retrieved at <<http://www.pgroup.com/lit/articles/insider/v2n3a3.htm>>, Sep. 2010, pp. 7.
"PIX," Retrieved at <<http://msdn.microsoft.com/en-us/library/ee417062(VS.85,printer).aspx >>, Retrieved Date: Oct. 18, 2010, pp. 2.
"NVIDIA Parallel Nsight," Retrieved at <<http://developer.nvidia.com/object/nsight.html>>, Sep. 22, 2010 , pp. 2.

* cited by examiner

*Primary Examiner* — Yolanda L Wilson

(57) ABSTRACT

User interface technologies for viewing the state of threads of a target parallel application, such as a massively parallel application intended to run on a GPGPU system, during debugging of the target parallel application are disclosed. The target parallel application includes a kernel, and the kernel includes a set of threads. Coalesced thread information of the threads is presented with the user interface technologies based on user-controllable criteria.

19 Claims, 3 Drawing Sheets

DEBUGGER PRESENTATION OF PARALLEL APPLICATION THREADS

BACKGROUND

A current focus for improving processor power is to provide multiple processor cores on a die to increase processor throughput. Central processing units, in higher-performing computing devices, such as workstations and servers, often include several processor cores included on a single die. Many of these devices also include one or more graphics processing units that each can include hundreds of processor cores on a single die. Graphics processor units, in addition to providing computations for computer graphics, are often configured to provide computations in applications previously provided by the central processing with a technique referred to as general purpose computing on graphics processing units, or GPGPU. In one example, GPGPU computing uses central processing units and graphics processor units together in a heterogeneous co-processing computing model. The sequential or relatively light-parallel parts of the application runs on the cores in the central processing units, and the computationally-intensive, often massively-parallel parts of the application are accelerated by the many cores in the graphics processing units. Parallel computer applications having many concurrent threads executed in GPGPU computing can realize a performance boost ten to one hundred times that over the applications executed on multiple core central processing units. Additionally, GPGPU systems typically are less expensive and use less power per core than multiple core central processing units.

Parallel computer applications having concurrent threads and executed on multiple processors present great promise for increased performance but also present great challenges to developers. The process of developing parallel applications is challenging in that many common tools, techniques, programming languages, frameworks, and even the developers themselves, are adapted to create sequential programs.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

The present disclosure describes user interface technologies for viewing the state of threads of a target parallel application, such as a massively parallel application intended to run on a GPGPU system, during debugging. The user interface technologies can also apply to target parallel applications in GPGPU software emulators, clusters or other device that executes programs having a large number of threads in parallel. A debugger is set to focus on a kernel of the target parallel application, and each kernel includes a plurality of thread groups each including a plurality of threads. When the target kernel enters break state, for example, the debugger has a notion of a current thread, and a current stack frame. The debugger determines a current thread group and information related to the threads. The thread information is collected and provided to a user interface and can be included within a presentation layer of the debugger. Coalesced thread information of the threads is presented based on user-controllable criteria. For example, coalesced thread information of the threads can be based by thread group vector, thread status, or source location, among other user-controllable criteria.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims. It is to be understood that features of the various exemplary embodiments described herein may be combined with each other, unless specifically noted otherwise.

Figure 1:
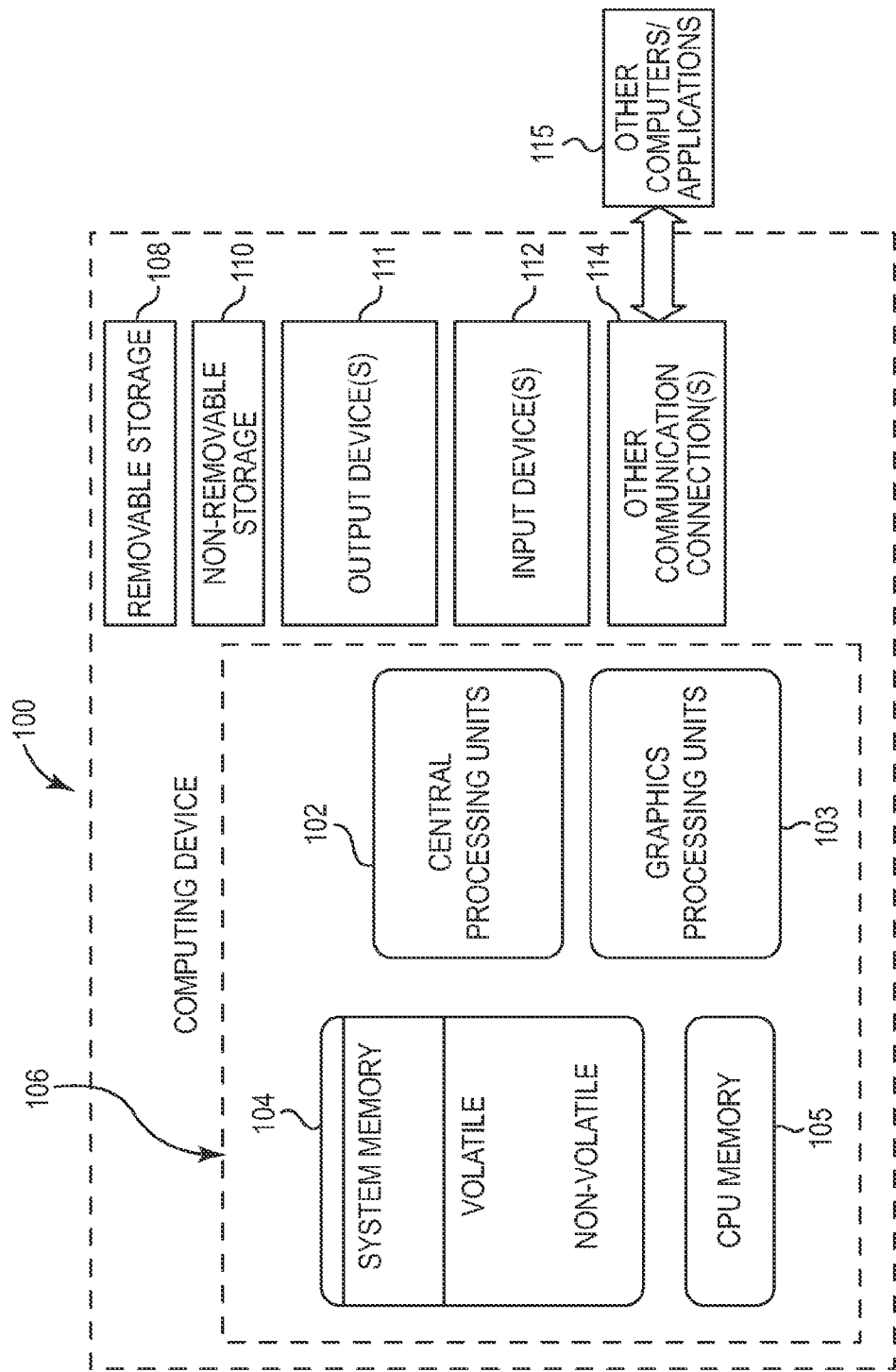
FIG. 1 is a block diagram illustrating an example computing device.

FIG. 1 illustrates an exemplary computer system that can be employed as an operating environment includes a computing device, such as computing device 100. In a basic configuration, computing device 100 typically includes a processing system having at least two processing units, i.e., a central processor 102 and a graphics processor 103, and memory 104 coupled to the central processing unit 102, and graphics processing memory 105. Depending on the exact configuration and type of computing device, memories 104, 105 may be volatile (such as random access memory (RAM)), non-volatile (such as read only memory (ROM), flash memory, etc.), or some combination of the two. This basic configuration is illustrated in FIG. 1 by dashed line 106. The computing device can take one or more of several forms. Such forms include a personal computer, a workstation, a server, a handheld device, a consumer electronic device (such as a video game console), or other.

Computing device 100 can also have additional features or functionality coupled together with a bus. For example, computing device 100 may also include additional storage (removable and/or non-removable) including, but not limited to, magnetic or optical disks or solid state memory, or flash storage devices such as removable storage 108 and non-removable storage 110, Computer storage media includes volatile and nonvolatile, removable and non-removable media implemented in any suitable method or technology for storage of information such as computer readable instructions, data structures, program modules or other data. Memory 104, 105, removable storage 108, and non-removable storage 110 are all examples of computer storage media. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, universal serial bus (USB) flash drive, flash memory card, or other flash storage devices, or any other medium that can be used to store the desired information and that can be accessed by computing device 100. Any such computer storage media may be part of computing device 100.

Computing device 100 includes one or more communication connections 114 that allow computing device 100 to communicate with other computers/applications 115. Computing device 100 may also include input device(s) 112, such as keyboard, pointing device (e.g., mouse), pen, voice input device, touch input device, etc. Computing device 100 may also include output device(s) 111, such as a display, speakers, printer, or the like.

The computing device 100 can be configured to run an operating system software program and one or more software applications, which make up a system platform. In one example, the computing device 100 includes a software component referred to as a managed, or runtime, environment. The managed environment can be included as part of the operating system or can be included later as a software download. The managed environment typically includes pre-coded solutions to common programming problems to aid software developers to create software programs, such as applications, to run in the managed environment.

A computer application configured to execute on the computing device 100 includes at least one process (or task), which is an executing program. Each process provides the resources to execute the program. One or more threads run in the context of the process. A thread is the basic unit to which an operating system allocates time in the processor 102, 103. The thread is the entity within a process that can be scheduled for execution. Threads of a process can share its virtual address space and system resources. Each thread can include exception handlers, a scheduling priority, thread local storage, a unique thread identifier, and a thread context (or thread state) until the thread is scheduled. A thread context includes the thread's set of machine registers, the kernel stack, a thread environmental block, and a user stack in the in the address space of the process corresponding with the thread. In parallel applications, threads can be concurrently executed on the processors 102, 103.

Figure 2:
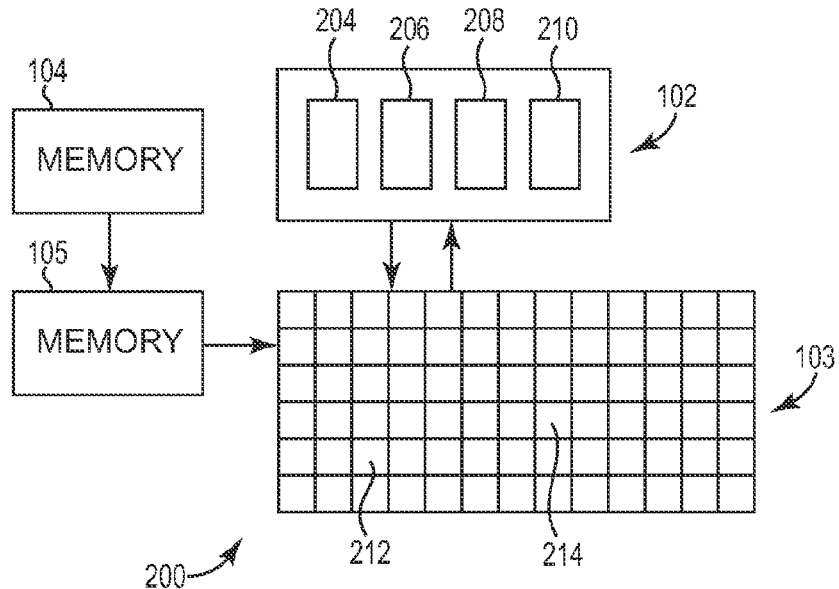
FIG. 2. is a schematic diagram illustrating an example of a multiple core processing system of the computing device of FIG. 1.

FIG. 2 an example multiple core processing architecture 200 including the central processor 102, the graphics processor 103, and the respective memories 103, 105 that can be implemented in the computing device 100 to concurrently execute threads as a GPGPU system. In this example, each of the processors 102, 103 includes multiple cores implemented on a single die. Other examples are contemplated where one or more of the processors 102, 103 exists on separate chips or even separate computer system, and the like. The example central processor 102 includes four physical processor cores 204, 206, 208, 210, or simply four physical cores, where each of the physical cores is available to process at least one application thread concurrently with at least one other physical core processing another thread. The graphics processor 103 can includes hundreds of physical cores, such as physical cores 212, 214. Each physical core can include a local memory (not shown).

In an example, graphics processor 103 can be packaged as System-on-Module (SoM) cards that use a bus, such as a PCI Express bus, as an interconnect. The cards can be inserted directly into a computing device 100 with a free PCI Express slot. In this example, the processing system 200 can run an operating system tuned for the desktop environment, such as that sold under the trade designation Windows 7 available from Microsoft, Inc., of Redmond, Wash., USA. In another example, graphics processor can be packaged as standalone, rack-mounted systems that often have an integrated central processor 102. In this example, the processing system can run an operating system tuned for cluster configuration, such as under the trade designation Windows HPC Server also available from Microsoft, Inc.

In the example, at least some of the physical cores may be capable of efficiently and concurrently executing multiple threads of a concurrent process. Such physical cores are often referred to as "Simultaneous Multi-Threading," or often simply "SMT," cores, and each of the concurrently executed threads on each SMT physical core shares hardware resources included with the SMT physical core. In the example of the multiple core processing system 200, each physical core is capable of multithreading. Multithreading technology aims to increase core efficiency through thread-level and instruction-level parallelism. Each physical core capable of multithreading, or the like, can present the operating system with as many logical cores as concurrently executing threads. In the example multiple core processing system 200, each physical core 204, 206, 208, 210 is capable of concurrently executing two threads, and thus provides the operating system with eight concurrent logical cores in the central processor 102. The computing device 100 can theoretically execute as many concurrent threads as there are logical cores in the device 100.

In an example processing flow of the multiple core system, data from a main memory 104 is copied into the memory of the graphics processor 105. The central processor 102 provides instructions to the graphics processor 103 on how to process the data. The graphics processor 103 will process the data in multiple concurrent threads. The graphics processor 103 will then copy the result into the central processor 102. Other examples are possible, and a GPGPU may be constructed in various architectures other than architecture 200.

Developers generally find parallel programming or parallelizing serial applications challenging enough with the current tools and lack of expertise. Parallel programming techniques for GPGPU systems add another level of complexity to an already challenging process. Additionally, debugging a target parallel program for a GPGPU is notoriously difficult. Traditional debuggers do not support computer applications intended for massively parallel devices, such as GPGPU systems, or they require a developer to select one thread at a time for analysis.

Figure 3:
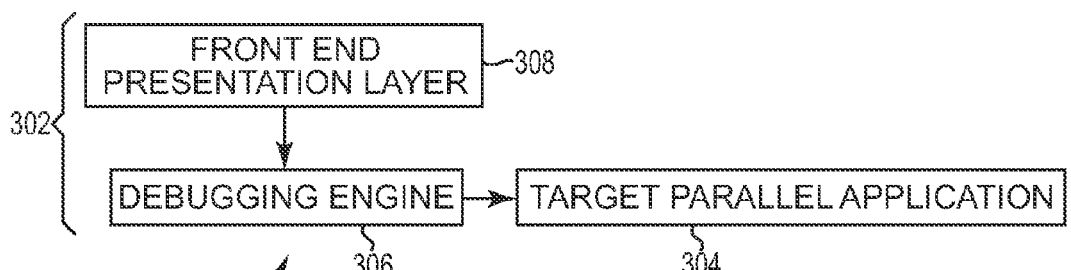
FIG. 3 is a block diagram illustrating an example of a target parallel application for the computing device of FIG. 1 being debugged with components of a debugger application.

FIG. 3 illustrates an example debugging system 300. A debugger 302 or debugging tool is a computer program that is used to test and debug other applications, i.e., the target application 304. The debugger can include components such as a debugging engine 306 and a debugging front end 308. The target application 304 can be in the form of the actual code of the program or simulated code running on an instruction set simulator. The debugging engine 306 provides debugging services such as execution control, breakpoints, and expression evaluation. In one example, the debugging engine 306 is responsible for monitoring the state of the target application 304 using whatever methods are available to it in the supported runtime. The debugger front end 308 provides a presentation layer or user interface. In many examples, the debugging engine 306 and debugger front end 308 are integrated together in a single debugger 302. For example, an integrated debugger 302 is included in an integrated development environment (IDE) such as that available under the trade designation of Visual Studio from Microsoft, Inc. The debugger front end 308 at times can also be adapted to function with a command line interface type debuggers to provide additional functionality and views.

In one example, debugger 302 is a source-level debugger, which can show the line or expression in the source code that resulted in a particular machine code instruction of a running program loaded in memory. This can be used to analyze the target application 304 in high-level terms such as source-level flow control constructs, procedure calls, named variables, rather than simply in terms of machine instructions and memory locations. Source-level debugging also makes it possible to step through execution a line at a time and set source-level breakpoints through the debugger front end 308. When the target application 304 reaches a preset condition, such as a crash, the debugger front end 308 will shows the position in the original code. Debugger 302 can also offer other functions such as running a target application 304 step-by-step, stopping or breaking at some event or specified instruction as selected with a breakpoint, and tracking the values of some variables.

The target application 304 can include a massively parallel application intended to run in a cluster structure, such as a GPGPU system, software emulators of GPGPU systems, or other computer hardware. Software code for massively parallel applications on GPGPU systems often is organized into one or more data parallel kernels such as compute shaders. For example, a developer constructs the data parallel kernel using a high level language such as HLSL (High Level Shader Language, developed by Microsoft, Inc.), compiles the kernel, and loads it onto a processing system for execution. The kernel can be organized into one or more thread groups and each thread group can have many threads. Thread groups are referenced within the kernel by a set of coordinates, and threads within each thread group are also referenced by a set of coordinates. For example, the thread group can be referenced by a set of 3 coordinates (x, y, z), and the threads can also be referenced by a set of 3 coordinates (x, y, z). The coordinates define vectors, and the vectors remain unchanged as the kernel executes.

During any point of the execution of kernel, some threads have completed execution, some threads are scheduled to run, and some threads are actively running. The active threads, however, can be at various locations in the code. At the hardware level, vectors of the active threads often in groups of sixteen to thirty-two threads, which execute instructions together. For example, the vectors of the active threads can be formed into a warp/wavefront that can be executed in a given number of cycles, such as four. If the code in the executing kernel includes branches, some threads will be inactive or diverged (such as if the vector—or warp/wavefront—is running, but not all threads are executing instructions at the same time). A graphics processor in a GPGPU system can include hundreds of groups with thousands of threads executing concurrently in such vectors, and the GPGPU system can include a plurality of graphics processors.

Figure 4:
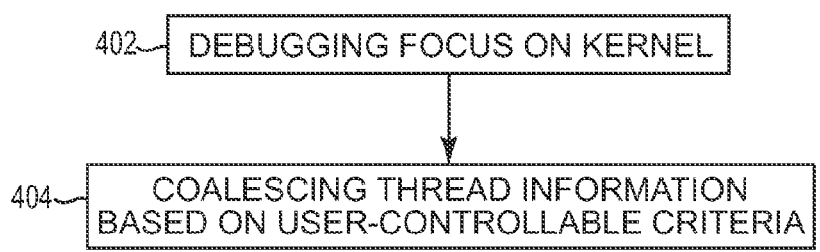
FIG. 4 is a block diagram of a method of debugging the example target parallel application of FIG. 3.

FIG. 4 illustrates an example method for use in debugging the target parallel application 304, such as a massively parallel application. A single kernel is set as the focus of the debugging at 402. When the target kernel enters break state, the debugger 302 has a notion of a current thread, and a current stack frame. From this, the debugger determines a current thread group and information related to the threads. If the threads are analyzed one at a time, the current thread is either from the central processor 102 or the graphics processor 103. The thread information is collected and provided to the user interface or debugger front end 308. Coalesced thread information of the threads is presented based on user-controllable criteria at 404. For example, coalesced thread information of the threads can be based by thread group vector, thread status, or source location, among other user-controllable criteria. Accordingly, the method 400 exposes to the user at debugging time the state of the thread groups and the corresponding threads and provides for the user to examine the state pertaining to a particular thread or a particular set of threads through thread switching techniques.

Figure 5:
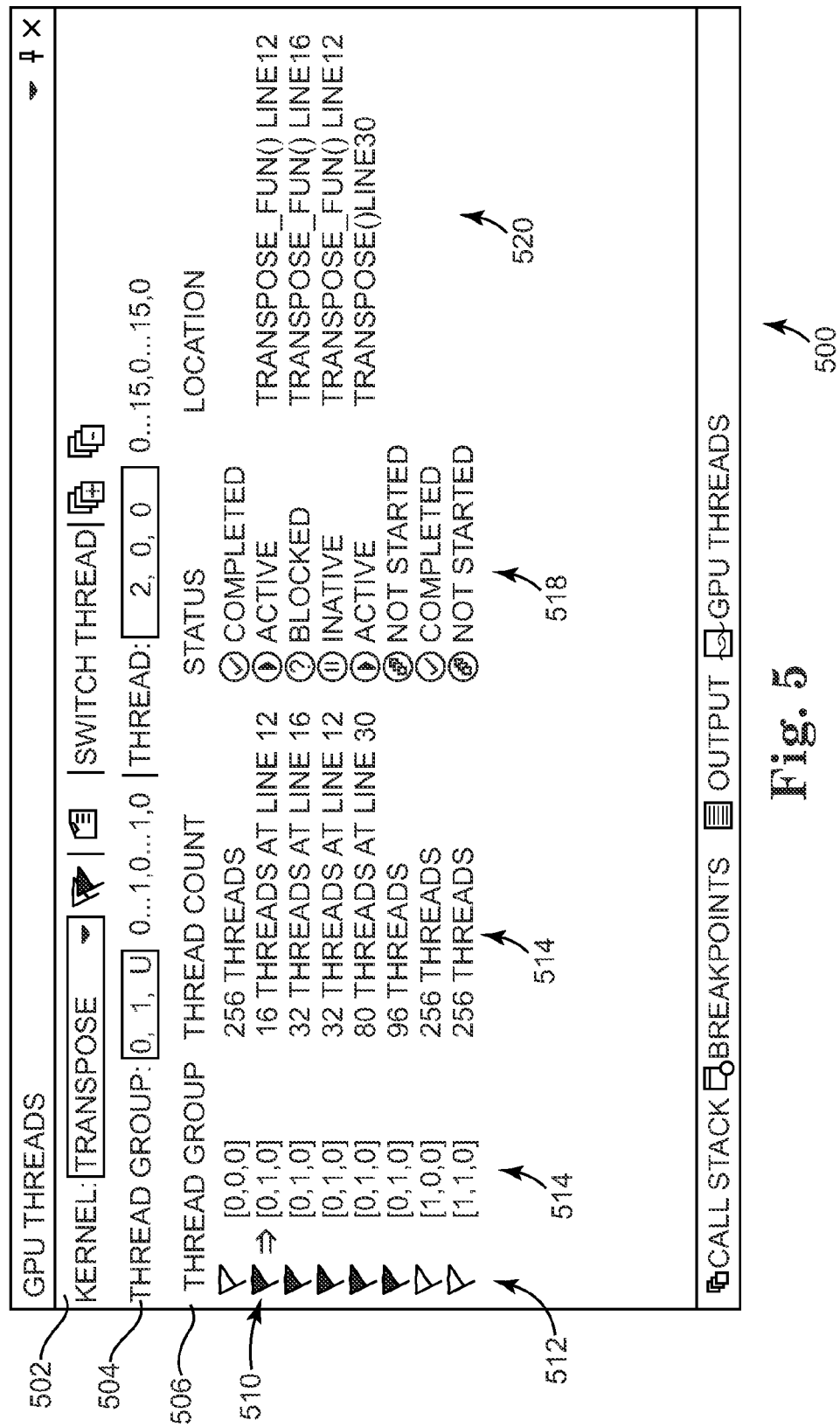
FIG. 5 is a schematic diagram illustrating an example user interface component of the debugger application of FIG. 3.

FIG. 5 illustrates an example user interface 500 constructed in accordance to the method 400. The user interface 500 presents a window describing the state of threads in the graphics processor 103 for a compute shader. The user interface 500 includes a section for a tool bar 502, a thread switcher bar 504, and a list view 506.

The tool bar 502 in the example appears at the top of the user interface 500. In one example, the tool bar 502 includes a drop down menu allowing a user to select a kernel from the one or more kernels of the target parallel application 304 to analyze. In the example, the selected kernel is labeled as "transpose." The tool bar can also include a button to show only flagged threads, a statistics button that can make a window appear having additional information on the debugging process, and other buttons.

The thread switcher bar 504 is located on the user interface 500 between the tool bar 502 and the list view 506. The thread switcher bar 504 can display the coordinates of a thread in the graphics processor by thread group and thread. The user can edit some or all of the coordinates to select a specific thread or thread group. The thread switcher bar 504 can include a pull down menu or range of valid coordinates for the kernel selected in the tool bar 502. For example, the thread switcher bar 504 can indicate that the valid ranges of the x, y, and z coordinates for the thread group be 0 to 1, 0 to 1, and 0 to 1, respectively, and the valid ranges of the x, y, and z coordinates for the threads within the selected thread group be 0 to 15, 0 to 3 5, and 0 respectively, The list view 506 occupies a large portion of the area of the user interface 500 of the example. Thread information for a plurality of threads are coalesced together and presented in a row 510. In the example, the list view includes threads coalesced by thread group for a specified kernel. The threads can be further coalesced by criteria listed in the columns of the list view 506.

The list view 506 also includes columns such as a flag column 512, a thread group column 514 (or vector column), a thread count column 516, a status column 518 showing the state of the coalesced threads, and a location column 520. One or more of these columns can be hidden from view, and additional or other columns can be included.

In one example, a coalescing algorithm can consider certain attributes of each thread such as the method name of the thread at the top of the stack, location in terms of line number and byte offset within the method, status of the thread, flagged state of the thread, and thread group.

For threads flagged in the window or in another user interface window of the debugger, threads coalesced by flags (or as not having flags) are presented in a row with a flag icon in the flag column 512. The example window includes five rows of flagged coalesced threads and three rows of unflagged coalesced threads.

The thread group column 514 displays the thread group coordinates, or vectors. In the example window, the user interface presents four thread groups by vector, i.e., [0,0,0], [0,1,0], [1,0,0], [1,1,0], presented over the eight rows. Certain programming models, however, do not expose thread group. An example includes DPC++ (Data Parallel C++), which is an extension of C++ computer language with typing mechanisms and parallel language constructs that provide a deterministic-by-default programming model. The window can be made aware of whether the target parallel application exposes threads, such as with an application programming interface (API). In the case of programming models such as DPC++, a thread group column is automatically not shown in a corresponding user interface.

The thread count column 516 indicates the number of threads represented in the row, or the number of threads coalesced by the criteria.

The status column 518 displays the state of the row of threads. The example user interface 500 includes five states of a thread in a graphics processor when the debugger 302 enters the break mode. In the example, the first three states are explicitly presented in the list view 506. An active state means the thread of was executing code when the debugger 302 entered the break mode. A diverged state is part of a warp is not executing code at the break mode due to a diversion. A blocked state is blocked at a barrier. Further, a thread in a trot-started state has not begun to execute code yet, but peer threads in the same thread group are active. Not-started threads can be reported as in an active state at the first line of the compute shader. Still further, a thread in a completed state has finished execution, but peer threads in the same thread group are still active. Completed threads also can be reported as in an active state at the last line of the compute shader. Threads that have not begun execution or have completed execution are not shown in the list view 506 if they do not have peer threads in the active state, but can be accounted for in a statistics section (not shown).

The location column 520 displays the method name such as a fully qualified method name.

The list view 506 can also include other columns and indicia not shown in the user interface 500. For example, the list view can show a line/offset column presenting a line number of the method that the thread has at the top of its stack, including the byte offset if the line number appears on other rows of the list view 506 with a different byte offset. For example, the row at the line/offset column can read "at line 11+0×2 bytes." Also, when the debugger enters a break state, the row of threads that includes the current thread can include an indicator such as an arrow on the list view 506. During break state, a user can switch the current thread to designate a thread from another row to become the current thread, and the indicator will change to that row.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method, comprising:
debugging a parallel application having a kernel including a plurality of thread groups each having a thread group vector and a plurality of threads each having a thread vector;
determining debugger information during a break state from a notion of a current thread and a current stack frame; and
presenting coalesced thread information of the plurality of threads based the debugger information in accordance with user controllable criteria including a selected kernel, a selected thread group vector, and a selected thread vector.

2. The method of claim 1 wherein the kernel is selected from a plurality of kernels in the parallel application.

3. The method of claim 1 wherein the kernel is a compute shader.

4. The method of claim 1 wherein the parallel application configured to be processed with general purpose computing on graphics processors.

5. The method of claim 1 wherein the presenting the coalesced thread information includes presenting the coalesced thread information in user interface.

6. The method of claim 5 wherein the user interface includes a window.

7. The method of claim 1 wherein the presenting the coalesced thread information is based on a range of coordinates of a thread group and a thread of the kernel.

8. The method of claim 7 wherein the presenting the coalesced thread information is also based on at least one of thread group, status of the threads, or location of the threads.

9. The method of claim 8 wherein the location of the threads describes a method name.

10. The method of claim 1 wherein the debugging is performed with a debugger engine and the presenting is performed with a debugger front end.

11. A computer readable storage medium which is not a transitory propagating signal storing computer executable instructions for controlling a computing device to perform a method comprising:
receiving debugger information for a target kernel including a thread group having a thread group vector, wherein the thread group includes a plurality of threads having a thread vector; and
presenting coalesced thread information of a plurality of threads based on the debugger information in accordance with user controllable criteria including a selected target kernel, a selected thread vector, and a selected thread vector during a debugging of a target parallel application.

12. The computer readable storage medium of claim 11 and further comprising a debugger engine configured to debug the target parallel application.

13. The computer readable storage medium of claim 12 wherein the presenting and the debugging are included in an integrated debugger.

14. The computer readable storage medium of claim 11 wherein the threads are included within a kernel of the target parallel application.

15. The computer readable storage medium of claim 11 wherein the presenting is performed for each break state of the debugging.

16. The computer readable storage medium of claim 11 wherein the threads are flagged.

17. The computer readable storage medium of claim 11 wherein the presenting the coalesced thread information is based on at least one of thread group, status of the threads, or location of the threads.

18. The computer readable storage medium of claim 11 and further including permitting a user to switch a thread designated as a current thread to another thread of the target parallel application.

19. A computer readable storage medium which is not a transitory propagating signal storing a parallel application development tool including a debugger user interface layer, wherein the debugger user interface layer is configured to perform a method comprising:

receiving debugger information for a target kernel selected from a plurality of kernels, wherein the target kernel include a plurality of thread group each having a thread group vector, wherein each of the thread groups includes a plurality of threads having a thread vector, debugger information being based on a notion of a current thread and a current stack frame; and presenting coalesced thread information of the plurality of threads based on the debugger information in a window in accordance with user controllable criteria including a selected kernel, selected thread group vector, and selected thread vector on the state of the threads from thread switching.

\* \* \* \* \*